United States Patent
Tan

(10) Patent No.: US 7,799,710 B1
(45) Date of Patent: *Sep. 21, 2010

(54) BALLISTIC/IMPACT RESISTANT FOAMED COMPOSITES AND METHOD FOR THEIR MANUFACTURE

(76) Inventor: Seng Tan, 1187 Richfield Center, Beavercreek, OH (US) 45430

( * ) Notice: Subject to any disclaimer, the term of this patent is extended or adjusted under 35 U.S.C. 154(b) by 213 days.

This patent is subject to a terminal disclaimer.

(21) Appl. No.: 12/079,057

(22) Filed: Mar. 24, 2008

Related U.S. Application Data

(63) Continuation-in-part of application No. 10/982,215, filed on Nov. 5, 2004, now abandoned.

(51) Int. Cl.
*B32B 5/24* (2006.01)
*B32B 3/26* (2006.01)

(52) U.S. Cl. .............. 442/221; 442/223; 442/224; 442/228; 442/233; 442/234; 442/370; 442/372; 442/373; 442/376; 442/378; 428/304.4; 428/309.9; 428/314.4; 428/314.8; 428/317.1; 428/318.4; 428/911

(58) Field of Classification Search .............. 428/304.4, 428/309.9, 314.4, 314.8, 317.1, 318.4, 911; 442/221, 223, 224, 228, 233, 234, 370, 372, 442/373, 376, 378
See application file for complete search history.

(56) References Cited

U.S. PATENT DOCUMENTS 6,568,310 B2 * 5/2003 Morgan ................ 89/36.02

* cited by examiner

*Primary Examiner*—Ula C Ruddock

(57) ABSTRACT

A foamed composite armor laminate comprising interleaved combinations of ballistic resistant fabrics, and ceramic and/or metallic plates or sheets in a polymeric foam matrix. The foamed composite armor can be fabricated by inserting polymer powder or sheets between layers of fabric and/or ceramic or metallic sheets to form a laminated structure, heating this laminated structure under pressure to form a consolidated panel, and then foaming the polymeric portion of the consolidated panel in an autoclave or pressure vessel by saturating the polymeric portion with inert gas at elevated temperature, rapidly releasing the pressure and controllably cooling the laminated structure to ambient. Alternatively, pre-foamed panels can be laminated to fabric, ceramic and/or metallic sheets using adhesives or the like. Through proper selection of the various elements of the laminate, i.e. the foamed polymer matrix, the polymeric fabric(s) and the ceramic and metallic sheet(s), a wide variety of ballistic, flame retardance, stiffness and other properties can be custom designed into the product for specific end use applications.

4 Claims, 4 Drawing Sheets

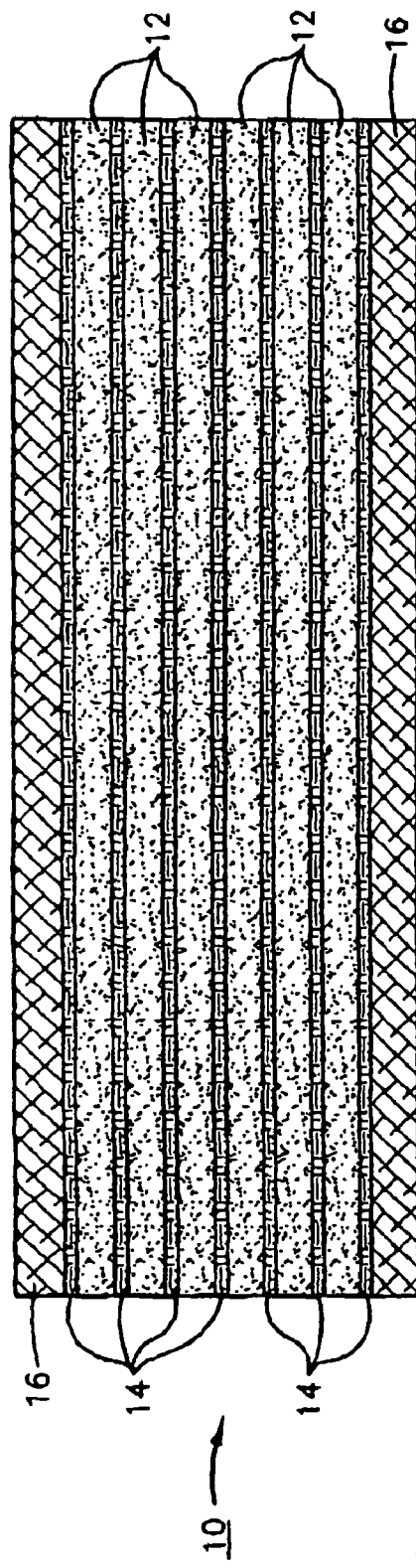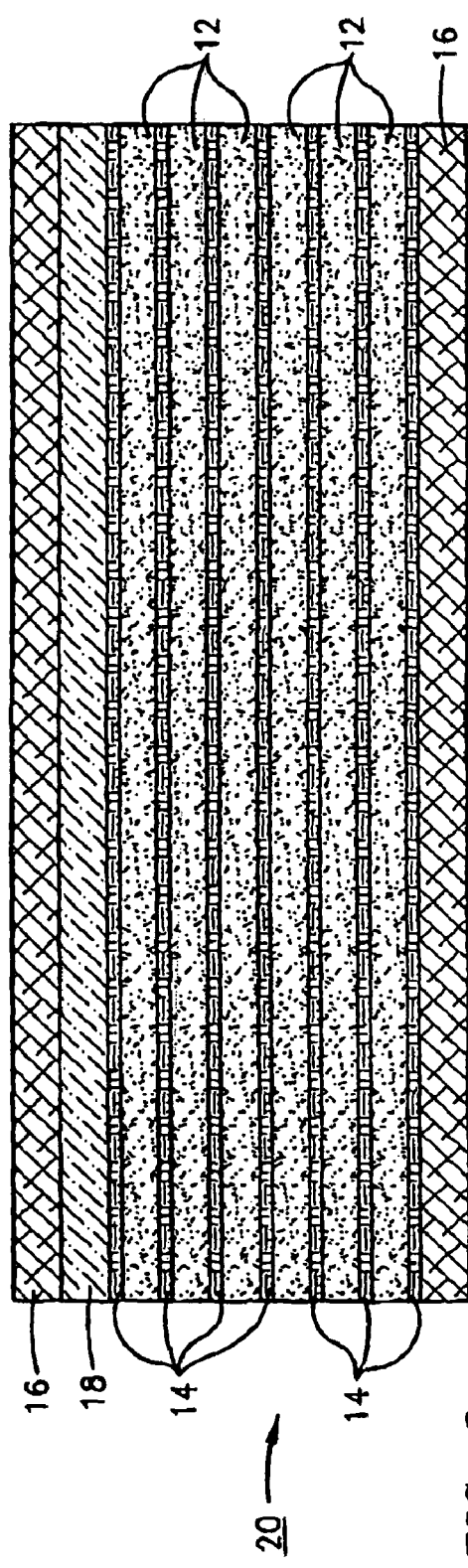

BALLISTIC/IMPACT RESISTANT FOAMED COMPOSITES AND METHOD FOR THEIR MANUFACTURE

This application is a continuation-in-part of U.S. patent application Ser. No. 10/982,215 filed Nov. 5, 2004 now abandoned.

The United States of America may have certain rights in this application under the terms of Contracts Nos. F33615-03-M-5033 and F33615-03-C-3321 from Wright Patterson Air Force Base.

FIELD OF THE INVENTION

The present invention relates to composite armor systems and more particularly to foamed composites comprising layered or laminated combinations of fabrics, fibers, ceramic and/or metallic plates in a polymeric foam matrix.

BACKGROUND OF THE INVENTION

Fiber reinforced composites have many applications in fields that require lightweight structure, fuel efficiency, and environmental durability in both the military and civilian sectors. In addition to the need for flame and moisture resistance, many military applications require that the materials have impact and ballistic resistant properties. Metals and ceramics are recognized to have good ballistic properties, but their densities are generally too high for applications that require mobility, ground, sea or air. Similarly, conventional polymeric foam cored sandwich structures are designed to enhance the bending stiffness of structures, but generally do not exhibit satisfactory ballistics resisance. Although such current foamed structures may have adequate impact properties for some applications, they do not have the required severe impact (ballistic) and flame resistant properties required for many military applications.

Current ballistic protective materials used for military vehicles and personnel shields include metals, ceramics, polymeric composites, and their combinations. Armor designs incorporating metals or ceramics with a backing material can successfully defeat armor piercing steel core projectiles, tungsten cores, and bomb fragments. However, the densities of these materials are normally too high for many applications including aircraft and portable protective shields. Conventional polymeric composites are significantly lighter in weight and generally offer good small arms protection. However, the demand for higher ballistic protection levels has increased due to the changes in the world scenario. New advanced materials and armor concepts must therefore be developed for military aircraft and personnel protection applications that offer higher protection levels, weight savings, and thus increased mobility and survivability of soldiers. Currently, for example, portable personnel protective shields used on the battlefield are made of metals. These structures are so heavy that they require several soldiers to move them. Anything this heavy cannot posses a mobility that is satisfactory for use in combat.

Many advanced materials have been developed to reduce the weight of combat vehicles and personal protective armor while maintaining ballistic protection limits. Current armor for combat vehicles includes a composite hull with add-on appliqué armor appropriate for the threat scenario. Armor designs containing ceramics are capable of meeting small arms ballistics requirements with substantial weight reduction from metallic structures. However, metallic and ceramic armor systems are both too heavy for personal protective shields that require mobility.

There are two major parameters that must be considered in designing armor, materials and structures. The first is the material system. The second is the architecture of the constituent materials. In the case of composites, they can be designed to resist, defeat, or deflect the ballistic projectile.

A wide variety of armor and armor systems have been designed and fabricated to in an attempt to meet the various land vehicle, personnel and aircraft armoring needs of the military. Some such examples are presented here. Metals, including titanium and aluminum alloys, have been shown to have higher ballistic resistance than boron/epoxy and graphite/epoxy composites, for example. However, even given the lightweight of the constituent materials they are generally very heavy and not suitable for extensive military aircraft applications. Ceramics are good for armor applications for ground vehicles. However, ceramics are very hard and brittle, which leads to fragmentation upon impact. Researchers have investigated an armor system comprised of a closed-cell aluminum foam layer between a ceramic tile strike-face layer and a composite backing plate. They noticed that the cells in the aluminum foam layers protected the armor by absorbing much of the impact energy and therefore delayed stress wave propagation through the armor. Researchers at Purdue University have constructed a multi-layered ceramic armor system that included a layer of either alumina or $TiB_2$, a graphite plate, and a hard cover plate. This system demonstrated good ballistic performance, but was too heavy and brittle for aircraft structural applications.

Fiber reinforced polymer composites have demonstrated that they can replace metals, ceramics and other ballistic materials in many applications. The combination of some resins with lightweight ballistic fibers/fabrics has shown ballistic potential against, for example, fragmentation. Because of relatively simple fabrication procedures, complicated components can be fabricated using this class of materials. For example, conventional polymeric composites are good candidates for aircraft and small arms protection applications and have been investigated as such. Aramid/Phenolic/PVB is currently used for the fabrication of military soft armor like helmets. Other materials that have been evaluated for this purpose include Glass/Vinylester, Spectra®/Vinylester, Glass/Spectra®/Vinylester, Spectra®/Glass/Vinylester, etc. The results of testing of these materials indicate that the ballistic resistance of Glass/Spectra®/Vinylester is marginally higher than that of the Aramid/phenolic/PVB for soft armor applications. To our knowledge, Kevlar® and PBO fabrics are the state-of-the-art polymeric materials for hard armor applications. This material system has superior impact strength and a tight weaving style.

Monolithic ceramic targets routinely deliver better than twice the ballistic performance of their metallic counterparts for small arms projectiles traveling at muzzle velocities. Notwithstanding such robust performance, however; the same ceramics may be defeated by the same projectiles traveling at considerably lower velocities. This disturbing phenomenon is known as "shatter gap". For example, aluminum oxide ceramic armor subjected to steel core .50 caliber M2 AP projectiles over a range of velocities exhibits "shatter gap" behavior.

In this type of ceramic armor system, at muzzle velocity, the defeat of the steel cored projectile is accomplished by blunting its rather pointed tip and shattering its steel core. Both of these core deformations are a result of the high surface hardness, modulus of elasticity and compressive strength of the ceramic. Rather than failing on impact, the ceramic maintains its surface to blunt the projectile's tip and reflects the high pressure shock wave from its rear surface back into the projectile. At the highest projectile velocities this shock pressure exceeds the ultimate strength of the core material and fractures the projectile into many pieces. Having distributed the forward momentum of the projectile among many smaller pieces, the defeat is easily accomplished by the armor back plate.

When the ceramic is impacted at considerably lower velocities, however, there may be insufficient pressure reflected back into the projectile to cause its shatter, and the projectile is left intact and nearly pristine. For a non-deformed core, defeat then depends on how much armor mass is there to stop it. An alumina ceramic impacted in this manner offers little resistance to penetration by a low velocity projectile, and the projectile easily parts the fractured pieces.

It is therefore apparent that there exists a continuing need for lightweight and improved armor systems for land vehicular, individual soldier and aircraft protection that provide the required ballistic resistance against a variety of threats all while being relatively light weight.

SUMMARY OF THE INVENTION

According to the present invention, there is provided a foamed composite armor laminate comprising interleaved combinations of ballistic resistant fabrics, and ceramic and/or metallic sheets or plates in a polymeric foam matrix. The foamed composite armor can be fabricated by inserting polymer powder or sheets between layers of fabric and/or ceramic or metallic sheets to form a laminated structure, heating this laminated structure under pressure to form a consolidated panel, and then foaming the polymeric portion of the consolidated panel in an autoclave or pressure vessel by saturating the polymeric portion with inert gas at elevated temperature, rapidly releasing the pressure and controllably cooling the laminated structure to ambient. Alternatively, pre-foamed panels can be laminated to fabric, ceramic and/or metallic sheets using adhesives or the like. Through proper selection of the various elements of the laminate, i.e. the foamed polymer matrix, the polymeric fabric(s) and the ceramic and metallic sheet(s), a wide variety of ballistic, flame retardance, stiffness and other properties can be custom designed into the product for specific end use applications.

DESCRIPTION OF THE DRAWINGS

FIG. 1 is a cross-sectional representation of a foamed composite armor in accordance with one embodiment of the present invention.

FIG. 2 is a cross-sectional representation of an alternative foamed composite armor in accordance with the present invention.

DETAILED DESCRIPTION

Figure 3:
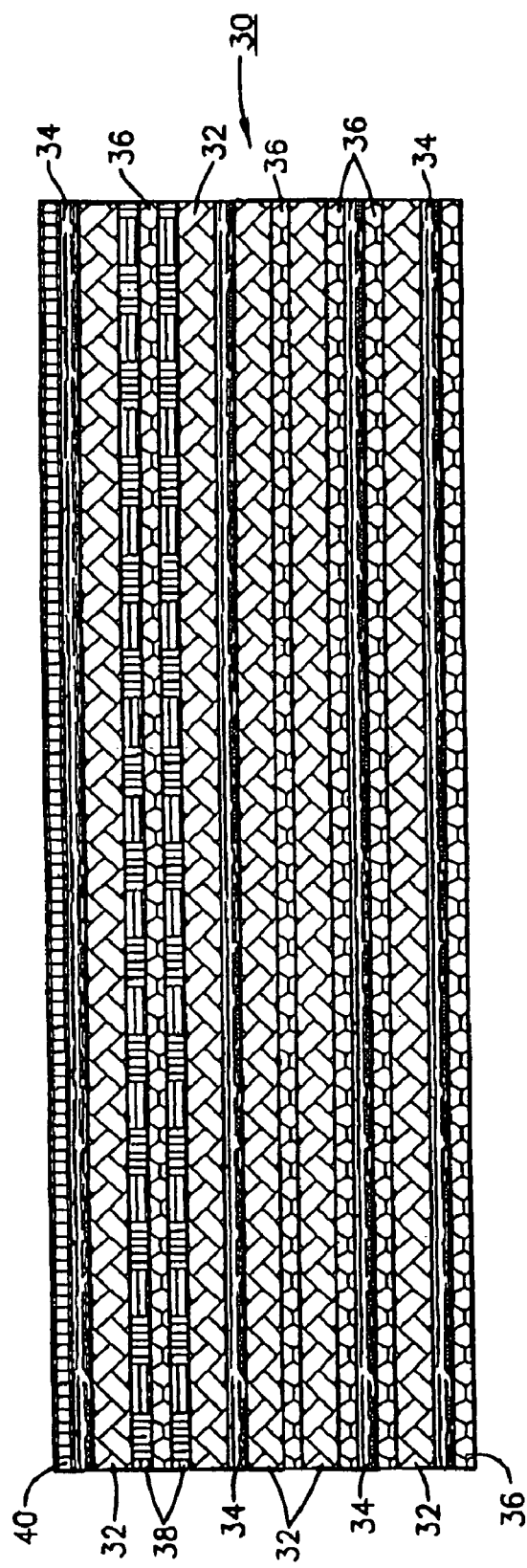
FIG. 3 is a cross-sectional representation of yet another alternative embodiment of a foamed composite armor in accordance with the present invention.

Fiber reinforced composites have many applications in the military and civilian sectors in uses that require lightweight structure, fuel efficiency, and environmental durability. In addition to the need for flame and moisture resistance, many military applications require that the materials have impact and ballistic resistance properties. Metals and ceramics are recognized to have good ballistic properties, but their densities are too high for applications that require mobility. Conventional polymeric foam cores are designed to enhance the bending stiffness of structures. Although current foamed structures normally have adequate impact properties for some applications, they do not have the required severe impact (ballistic) and flame resistant properties required in such more demanding military applications. In this invention we have developed a new class of microcellular foamed composites and sandwich structures that posses all of the desirable properties mentioned above in connection with foam sandwich structures but with the additional capability to accept multiple ballistic impacts at the same location or at close vicinity to the same location. The processing techniques used in the fabrication of the foamed sandwich composites of the present invention do not involve any toxic chemicals. The composites themselves are very lightweight, and considering the threat level they can defeat, are excellent for applications that require mobility. Additional features include high mechanical properties at elevated temperatures, ductility, and the ability to resist fragmentation from neighboring broken components.

The inventor hereof has developed several foaming techniques to process foams from polymers and carbons. For example, fibers reinforced liquid crystalline polymer foams and semi-crystalline foams, U.S. Pat. No. 6,232,354 B1 by the present inventor, use fibers (in micron scale) as a reinforcing phase. These foams are not intended for ballistic protection applications. The lightweight foamed composites of the present invention comprise, in one of their preferred embodiments, multiple layers of Kevlar® or polybenzobisoxazole (PBO) fabrics embedded in a microcellular foamed matrix made from engineering polymers like liquid crystalline polymer (LCP) or polyetherimide (Ultem®) instead of the materials described in the referenced patent. The microcellular LCP foam, for example, has demonstrated superior flame retardance, moisture resistance, fracture toughness, and impact resistance. The state-of-the-art Kevlar® (para-aramid), Spectra® (ultra high molecular weight polyethylene) and PBO (polybenzobisoxazole) fabrics, some incorporating layers of ceramic (for example alumina and boron carbide) and metal plates (such as titanium), have all shown excellent ballistic resistant properties. The combination of some or all of these components into a laminated foamed composite armor structure provides a new family of lightweight ballistic resistant materials and sandwich structures that have great potential for many military and commercial applications.

The foamed composite sandwich materials processed of the present invention are lightweight, exhibit excellent impact and ballistic resistance, have pore sizes from a few to about 500 micron meter in diameter, and also demonstrate excellent flame resistance when an appropriate polymer is used as the foamed matrix. The foamed composites and sandwich structures of the present invention can be further reinforced with other materials including, but not limited to, chopped fibers, whiskers, or particles of polymer, ceramic, metal or hybrids to enhance their mechanical, electrical, or thermal properties as desired.

Referring now to the accompanying drawings, depicted in FIG. 1 is one preferred embodiment of the laminated composite foamed armor of the present invention. As depicted in FIG. 1, a simple composite armor structure in accordance with the present invention 10 comprises a laminated structure of alternating plies or layers of, for example a polymer foam 12 fabricated as described herein and polymeric fabric sheets 14 of the same or different such materials as described herein with outer surfaces 16 of, for example, Kevlar®/PBO/Spectra® composite resin skins or facesheets.

In the embodiment depicted in FIG. 2, a structure 20 similar to that depicted in FIG. 1 is shown, except that in this embodiment, a ceramic or metallic sheet 18 has been laminated between the laminated foam/polymeric fabric core and one of the Kevlar®, PBO or Spectra® composite resin fabric skins or facesheets. As will be obvious to the skilled artisan, a second or a plurality of ceramic or metallic sheets 18 could be laminated into the structure at or near the surface or in the body of the laminate depending upon the end use of the laminate.

Depicted in FIG. 3 is a cross-section of yet another embodiment of the laminated structure of the present invention. The laminated foamed composite armor depicted in this FIG. 3 comprises a plurality of foamed layers or plies 32 laminated between or interleaved with plies of graphite fabric 34 and Kevlar®, PBO or Spectra® fabric 36 and adhesive layers 38 as described herein. Facesheets 40 comprise a ceramic or metallic sheet.

From the foregoing description of the drawings, it will be apparent to the skilled artisan that any arrangement of alternating layers of ballistic resistant fabric and/or ceramic or metallic sheets interleaved or laminated with layers of foamed polymer having a cell size of between about 1 and about 500 μm is to be considered as within the scope of the present invention. All such combinations provide some enhanced degree of ballistic protection do to the presence of the cellular foam. Through the careful selection of the various polymers, flame retardancy may also be incorporated into the composite armor structure described herein. Preferred foams are open or closed cell polymer foams having a density below about 35 pounds per cubic foot and preferably 20 pounds per cubic foot and a pore size of less than 0.1 inch.

The facesheets and interleaved elements of the foamed sandwiches or laminates of the present invention, i.e, the ballistic resistant fabric or sheets are fabricated by the combination of tightly woven para-aramid, graphite/epoxy, ultra high molecular weight polyethylene (2,000,000 or more in molecular weight) fabrics, ceramic plates, metal plates, and other commercially available materials in a foamed matrix produced by the controlled application of heat and pressure. Similarly, superalloy, intermetallic, metal matrix composite and ceramic matrix composite sheets or plates may also be utilized for such purposes in certain applications. According to various preferred embodiments of the present invention, useful tightly woven fabrics include those having extensional moduli over 10 msi, and superalloy, intermetallic, metal matrix composite and ceramic matrix composite sheets or plates include those exhibiting hardnesses over 1000 kg/mm$^2$.

Figure 4:
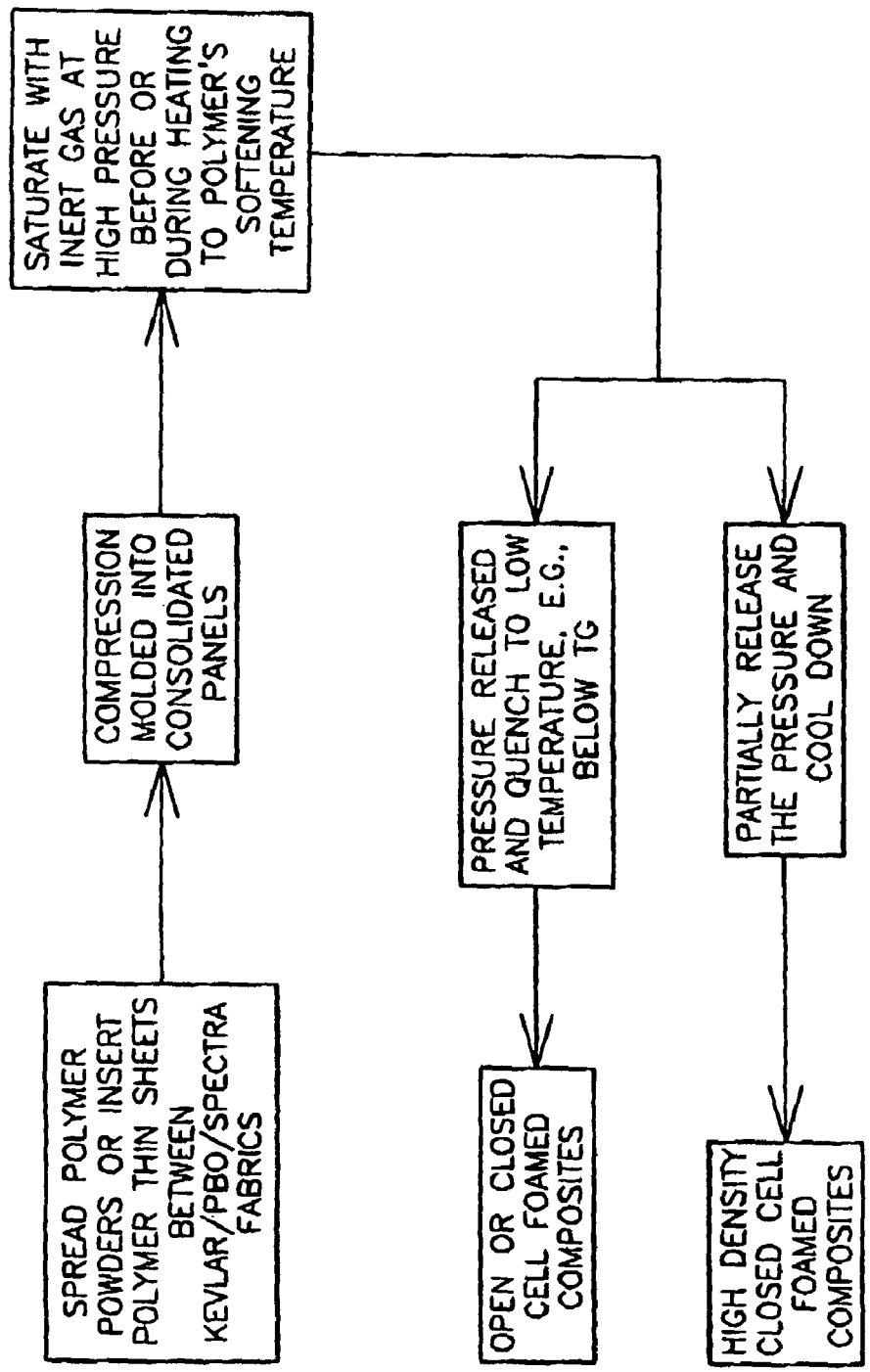
FIG. 4 is a process flow diagram of one embodiment of the process used to fabricate the foamed composite armor structures of the present invention.

Referring now to FIG. 4 that shows a process flow diagram for the fabrication of the composite foamed armor structures described herein, the structures of the present invention may be fabricated in two manners. In the first method, an appropriate polymeric powder that can be foamed as described herein is spread between the plies or layers of ballistic fabric or ceramic or metallic sheet to form a "pre-laminate". The prelaminate is then consolidated by compression molding into a consolidated panel. T consolidated panel is then saturated with an inert gas at elevated pressure either before or during heating to the polymer powder's softening temperature and then controllably releasing the pressure and cooling to a temperature below the $T_g$ of the polymer, all in accordance with the teachings of the '354 patent referenced hereinabove. As indicated in FIG. 4, depending upon the method of pressure release and cooling, the foamed polymer will have either an open or closed cell low density or closed cell high density structure. The details of such processing techniques are described in detail in the '354 patent.

In the second method, an appropriate polymeric material is formed into sheets by foaming in accordance with the teachings of the '354 patent, such sheets are then joined to the other fabric/sheet members of the laminate using an appropriate adhesive.

The foamed composite armor materials of the present invention are characterized by fabrics and/or fillers embedded in a polymer foam matrix. The foam matrix is characterized by cell diameters of from about 1 to about 500 micron. The pores can be either closed or open cell. A foamed composite can be fabricated by a one-step or two-step process. The one-step process comprises fabricating the reinforced polymer foam matrix in a single step without the use of an adhesive. The two-step process comprises processing the foam first and then bonding the fabrics to the foam sheet(s) using an adhesive. A foamed sandwich composite is defined as a laminated structure that comprises a foamed composite core with facesheets. The facesheet can be applied on one or both sides of the foamed composite core. The facesheet itself can be a monolithic or a composite material as described hereinafter. In the case of thermoplastic polymers the facesheets can be bonded to the foam core by heat pressing. They can also be bonded conveniently by an adhesive cured at room or elevated temperatures.

The instant invention provides foamed composite and sandwich structures with superior impact and ballistic resistance properties. Although the fabrics used can be any commercially available material, they are preferably chosen from those that exhibit excellent ballistic properties including but not limited to Kevlar®, PBO, Spectra®, ceramic cloth/sheet, metallic cloth/sheet, etc. The foam matrix can be produced from any commercially available polymer, but preferably comprises a member selected from the group of polymers that exhibit superior fracture toughness including but not limited to liquid crystalline polymers (LCP), while other polymeric materials that do not exhibit extremely high fracture toughness might be utilized in certain less demanding applications. These include but are not limited to polycarbonates, polyetherimides (PEI), polyimides, polyesterss, polyurethanes, epoxies, elastomers, crystalline polymers and semicrystalline polymers.

The matrix of the foamed composite armor preferably exhibits the morphology of a microcellular foam because of the excellent capability of such structures to absorb impact energy as compared to the parent resin in either the form of a solid or as a foam having macro-sized pores. The reason that microcellular foams can absorb large amounts of impact energy can be explained by their damage mechanisms. In a microcellular foam, during impact, the cell wall is deformed and collapsed but does not create a sharp crack. Impact energy is transformed into a large deformation on the surface energy of the broken pieces. As the projectile passes through the foamed matrix it strikes the ballistic fabrics that greatly reduce the impact energy by converting it into broken fibers, possibly causing some delamination. In addition, replacement of the solid matrix of a conventional composite with foam increases the flexibility and fracture strain of the foamed composite. This kind of plastic deformation also can adsorb a large amount of impact energy and dramatically improve the fracture toughness. In the case where the projectile has a pointed tip, contains a hard metal core, and travels at speeds of thousands of feet per second, the foamed composite should contain ceramic and/or metallic plate to break up the tip and drive the kinetic energy into the hard metal core as described above (see, for example, FIG. 2). Although this ceramic or metal plate can be placed anywhere in the foamed composite sandwich, it is preferably located near the outer surface of the composite that will be initially struck by a projectile. As the projectile impacts the ceramic/metallic plate(s) its pointed tip will be blunted and its travelling speed significantly reduced. The underlying ballistic fabrics and polymer foam then have a higher capability of defeating the projectile with a blunted tip.

The lightweight foamed composite armor materials of the present invention offer several unique features that stand out from conventional ballistic materials and structures. The facesheets are preferably made of fabrics, fibers or sheets of ceramic or metal that enable the sandwich to have excellent bending stiffness. Therefore, it can be used as a load carrying ballistic structure. The facesheets and foamed matrix can greatly reduce the backface or rear surface deformation of the ballistic composite upon impact. Without these components, the large deformation of the backface of the material due to a projectile can seriously wound or kill a person who wears it. An example of a ballistic material without such facesheets and foamed matrix is the personnel protection Kevlar®vest as currently utilized. The layered structure of foamed matrix and ballistic fabrics possesses a unique capability to capture the projectile inside the sandwich structure. The ductility of the material enables it to defeat multiple shots at the same location or at close vicinities. This ability can capture and defeat debris impact or secondary impact from the same projectile. When multiple debris hit a ceramic or metal armor, especially at an off-axis angle, they may bounce off and hit surrounding people and/or instruments. Conventional ceramic armors are also so brittle that while they may defeat an initial strike they cannot defeat multiple strikes in the same or a nearby area. Metal armors are extremely heavy and thus greatly affect the mobility of a person or vehicle that carries them. In addition to all these ballistic defeating and load carrying capabilities, the foamed composite sandwiches of the present invention are very light in weight. Note that the ceramic/metal plate mentioned above for the foamed composite is not limited to ceramic and metals, but rather, any material that is very hard will similarly serve the purpose.

During the fabrication of the foamed composite, one can spread polymer powders between adjacent layers of Kevlar®/PBO/Spectra® and carbon fabrics as described above in connection with the first method of fabrication. Alternatively, thin sheets of polymer can be used as described above, in connection with the second method of fabrication. The thickness of the foamed composite can be determined by the amount of polymer and number of fabrics used as well as the projectile stopping capability desired for the particular application. A schematic of such a layup is shown in FIG. 3. In the first or "one step" fabrication technique, molding or formation of the consolidated panel of the composite is typically obtained by heating the laminate to a temperature about 50° C. above the $T_g$ of the polymer and holding the temperature for about 30 minutes under pressure. Subsequent cooling to room temperature leaves the consolidated panel ready for foaming.

The consolidated panel is foamed in a pressure vessel using the process schematic shown in FIG. 4. The composite is softened in the pressure vessel by raising the temperature to the melting or softening temperature of the polymer under an environment of inert gas. The consolidated composite is then saturated with an inert gas at high pressure. The saturating gas can be nitrogen, carbon dioxide, helium etc. These gases have a different solubility in the selected polymers and the choice of the appropriate gas will be determined by the porosity of the foam desired. The pressure can be applied either: (1) before the heating cycle starts; (2) during the heating step; or (3) after the temperature reaches the set point. After holding the sample at the foaming temperature and saturated pressure for a period of time, for example, from 10 minutes to several hours depending on the thickness of the specimen, the pressure is released quickly and the laminate cooled down controllably to a temperature below the Tg of the polymer. This step locks in the microstructure of the foamed composite. As shown in FIG. 4, there are two alternatives to perform the last step. The first is to release the pressure quickly and completely and cool down the sample. This can create low-density foam in the foamed composite. Another way is to release the pressure partially and cool down. This technique will create high-density closed-cell pores in the foamed composite. Our foaming technique is based on the principle of thermodynamic instability that can create pores with uniform size. The pore sizes can be controlled from a few to hundreds of microns in diameter depending on a number of processing parameters like type and pressure of saturation fluid, soaking temperature, and rate of cooling.

As was discussed above, the holding time after the sample reaches the set temperature and pressure can be as short as about 1 minute for thin samples but can also be longer than 5 hours if the samples are relatively thick. Sufficient time is desirable for the fluid to homogeneously dissolve in the polymer matrix for the entire specimen, from surface to center. Therefore, if a longer time is needed it should not be restricted by the range of time stated above.

The present invention can applied to other kinds of fiber materials, fabric designs, different stacking sequences, different thicknesses and number of fabric layers, and further provides for the inclusion of high modulus fibers like graphite/carbon and glass in the foamed matrix. Any variation of this nature is clearly within the scope of this invention. Any person skilled in polymer processing can reproduce the foamed composite and sandwich structures described herein using the techniques disclosed herein.

As just alluded to, the polymer foam matrix can be reinforced with either one or the combination of the following ingredients: fibers, whiskers, particles, and complex regular or irregular shapes. The reinforcement may serve the purpose of enhancing of mechanical, thermal, electrical, or other functional properties of the laminate.

When fabricating the composite armor laminates described herein in accordance with the second method described above, there are at least two techniques to prepare the fabric elements of the foamed sandwich structures of the present invention. The first is to infiltrate or coat the ballistic fabrics mentioned above with a thermoplastic or thermoset resin. Practically speaking, any resin can be used. Preferably, it should have a high fracture toughness, high fracture strain, flame resistance, and low cost. The fabrics are then cut (unidirectionally, bidirectionally, or multidirectionally) into the desired size and shape. After stacking the desired number of fabric plies and polymer sheets to be foamed inside a mold or two metal plates they are heated to the softening temperature of the polymer under pressure sufficient to keep them in close contact (e.g., 10~300 psi) and held for a short period of time, 5 minutes to perhaps up to an hour to form a consolidated structure. After cooling down to a temperature below the Tg or softening point of the polymer, a suitable ballistic fabric is obtained. The second technique is to spray small amount of polymer powder between each of two adjacent layers of fabrics placed inside a mold. The number of fabrics used basically determines the thickness of the fabric for the sandwich structure. The mold is then closed and heated under pressure as just described to obtain consolidation. For high impact/ballistic protection applications, it is desirable to keep the concentration of the resin small. To fabricate a sandwich structure according to this method, a paste or film adhesive is applied between the facesheets/ballistic fabric elements and the foamed composite plies and the adhesive cured at room or elevated temperatures depending upon the adhesive used.

The following examples will serve to better illustrate the successful practice of the present invention:

Example 1

Xydar® SRT900 (LCP) powders were obtained from Amoco (4500 McGinnis Ferry Rd., Alpharetta, Ga. 30202). Kevlar® and Zylon® (PBO) fabrics were purchased from Barrday, Inc. (75 Moorefield St., P.O. Box 790, Cambridge, ON N1R 5W6) and Hexcel Schwebel (2200 South Murray Ave., Anderson, S.C.). Five pieces of PBO fabric about 12 by 12-in were cut. The Zylon® fabrics were laid in a steel mold and Xydar® powders spread between adjacent layers of Zylon® fabrics. The mold was then closed and heated up under clamping pressure to about 320° C. for about 30-min. After cooling to ambient a consolidated panel was obtained. The consolidated panel was foamed using a pressure vessel at a foaming temperature of about 370° C. under nitrogen gas at about 3000 psi in accordance with the practice of U.S. Pat. No. 6,232,354 which is incorporated herein by reference in its entirety. After holding the temperature for a short period of time the gas was vented quickly and the sample removed from the mold. A cross-section of the foamed composite cut by a saw shows that it is very homogeneous. The density of this foamed composite is 21.75 pound/cubic-foot (pcf). Following the same procedures, molded and foamed composites containing 5 to 10 layers of Kevlar® fabrics embedded in Xydar® powder have also been formed. Composites comprising 5 to 10 alternating layers of PBO and Xydar® powder have also been foamed successfully.

Example 2

Figure 5:
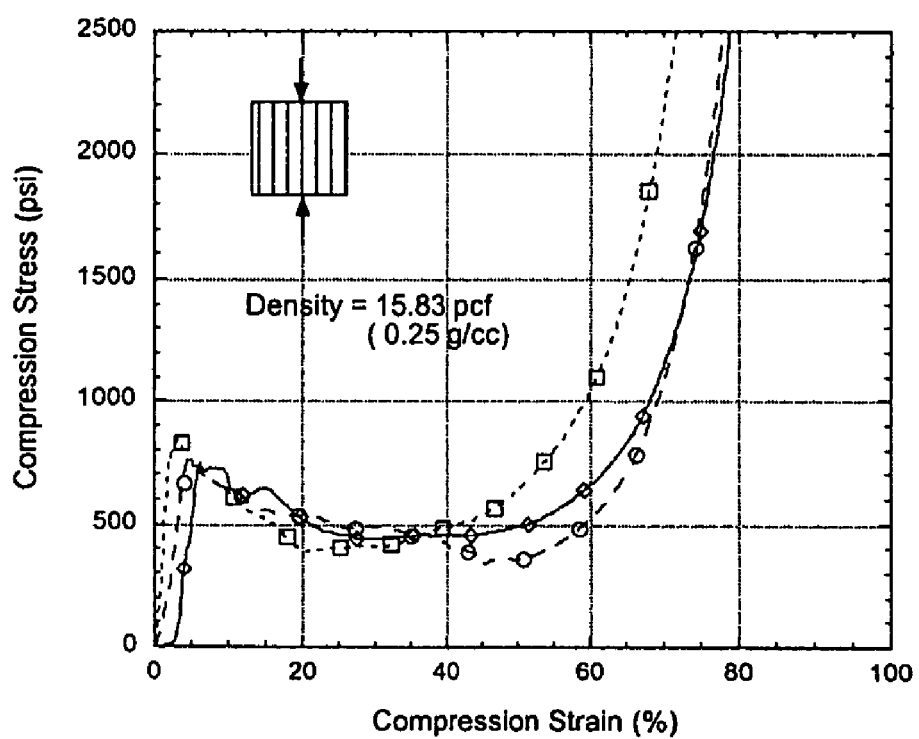
FIG. 5 is a graph showing the result of compression testing of a Kevlar®/Graphite/Ultem® laminated composite armor in accordance with the present invention.

Ultem® (polyetherimide) powders obtained from GE Plastics (One Plastics Ave, Pittsfield, Mass. 01201) and graphite/fabrics obtained from BFG Industries, Inc. (90 Huger Street, Cheraw, S.C. 29520) were molded into composite panels, 12 by 12-in, using 5 to 19 layers of Kevlar® or Zylon® (PBO) fabrics with Ultem powders between adjacent layers of fabric by treatment at about 325° C. under elevated pressure. Additional panels also containing 4 layers of graphite fabric, 2 near the bottom surface and 2 near the upper surface were also molded. The composite panels were foamed using a pressure vessel at about 300~325° C. with nitrogen as the foaming gas, at pressures between about 1500~5000 psi. After holding at temperature for about 20 minutes, the gas was vented and a foamed composite panel obtained. The foamed composite panel was sawed into cubical shapes for compression testing. Cross-sectional views show that these foamed composites have a very uniform structure. The results of compression testing are shown in FIG. 5. The densities of Kevlar®/Ultem® and Zylon®/Ultem® foamed composites ranged from 15 to 22 pcf. The density of the foamed composites can, of course be adjusted upward or downward using the techniques previously described and also referred to in U.S. Pat. No. 6,232,354, by adjusting the saturating pressure, type of fluid, and cooling rate.

Example 3

Phenolic coated Kevlar® fabrics and phenolic coated Zylon® containing less than 20% by weight of phenolic were obtained from Barrday Inc. and, Hysol® EA 9696 film and paste adhesives were obtained from Loctite Aerospace (2850 Willow Pass Road, P.O. Box 312, Bay Point, Calif. 94565). Facesheets were fabricated using 24 plies of Kevlar® 745 bonded with the Hysol® adhesives. These facesheets weighed about 2.5-lb and were 0.44-in thick. Compression molded panels 12.25 by 12.25-in were fabricated with these facesheets in accordance with the process described in Example 2. The thickness and weight of these panels were about 0.32-in and 1.79 lb. Similar panels were also fabricated using 20-25-layer of Zylon® fabrics. A panel with 25 plies of phenolic coated Zylon® weighed about 1.18 LB and measured about 0.203-in thick. Two facesheets and a foamed core were bonded together using either 2 layers of film adhesive or some paste adhesive, EA9696, between each interface. They were then cured at 250° F. to form the laminated composite armor structure.

Example 4

A foamed composite was fabricated using 12 layers of Kevlar® 705 and alternating layers of Xydar® powder using the procedures given above in Example 1. Two facesheets each containing 18 plies were molded using phenolic coated Kevlar® 745. A foamed core produced in accordance with the process described in Example 1 was bonded to the facesheets using Hysol® EA9696 film adhesive. This foamed composite sandwich weighed 5.28 pound/square-foot (psf). Another foamed composite was fabricated using 5 plies of PBO and alternating layers of Xydar® powder using the same procedure. Two facesheets each comprising 25 layers of phenolic coated Zylon fabrics were then molded. The foamed composite was bonded to the facesheets using EA9696 adhesive. This foamed composite sandwich weighed 3.71 psf. Ballistic tests were performed using a 44 Magnum projectile under the following conditions:

(1) 44 Magnum (15.55 g) at 1200 fps,
(2) 44 Magnum (15.55 g) at 1400 fps,
(3) 44 Magnum (15.55 g) at 1650 fps,
(4) 44 Magnum (15.55 g) at 1800 fps,
(5) 44 Magnum (15.55 g) at 1900 fps.

The foamed composite sandwiches defeated every projectile at every speed. All the projectiles were trapped inside the composite. A third foamed composite was fabricated using 8 plies of Zylon® fabrics and alternating layers of Xydar® powder and foaming performed at 3500 psi of nitrogen gas. The facesheets were molded using 14 plies of Kevlar® 745. This foamed composite weighed 4.31 psf. Ballistic tests were performed at the following conditions:

44 Magnum (15.55 g) at 1400 fps with one shot at one location,
44 Magnum (15.55 g) at 1400 fps with 3 shots at the same location,
44 Magnum (15.55 g) at 1900 fps with one shot at one location The composite panels again defeated every projectile at every speed. All the projectiles were trapped inside the composite.

Example 5

A foamed composite was fabricated using 7 plies of Kevlar® 745, 4 layers of graphite fabric, and alternating layers of Ultem® powder foamed at 310° C. and 2560 psi of nitrogen. Each facesheet was molded using 24 layers of phenolic coated Kevlar® 745. The facesheets and the foamed composite were bonded using EA9696 paste adhesive. This foamed composite weighsed 7.09 psf. Ballistic tests were performed using AK47 hollow point bullets (7.9 gm). The bullet traveled at a muzzle velocity of 2396 fps. The foamed composite sandwich defeated all of the AK47 projectiles shot at close range.

Example 6

Flammability tests were performed using ASTM E 1354v Cone Calorimeter tests at a radiant heat flux of 35 KW/m$^2$. The test results, Table 1, indicate that the weight losses of black PMMA (as a reference), Kevlar®/Xydar® foamed composite sandwich, PBO/Xydar® foamed composite sandwich and Xydar® foam are 100%, 30.8%, 5.9%, and 46.4%, respectively. Apparently, the foamed composite sandwiches presented in this invention are superior to black PMMA and other polymer systems tested by the FAA. During the entire test, the following properties were recorded and plotted: HRR (heat release rate per unit area), SPR (smoke production rate per unit area of exposed specimen), mass lost, $t_{ig}$ (time to ignition and sustained flaming over specimen surface for at least 10 sec), and $t_b$ (total burning duration—ignition to mass loss less than 150 g/m$^2$). These results are presented in Table 1 below.

strength decreases slightly until about 45% strain when the strength drastically increases. There is no sign of fracture for the entire loading history for loadings up to about 85% applied strain.

Example 8

Boron carbide (B$_4$C) plates about 12 by 12 by 0.2-in were obtained from Ceradyne, Inc. (3169 Red Hill Ave., Costa Mesa, Calif. 92626). A foamed composite was fabricated using 5 layers of K745, 4 layers of graphite fabric, 1 B4C plate, and Ultem® powder and the laminate foamed at 315° C. and 3250 psi of nitrogen as previously described. The B$_4$C plate was placed near the bottom surface on top of a graphite layer. Two facesheets each containing 24 layers of phenolic coated K745 were molded and bonded to the foamed core using EA9696 adhesive. This foamed composite sandwich weighed 8.4 psf. Ballistic tests show that it defeated an M855 rifle ball round.

Example 9

A foamed composite was fabricated using 5 layers of Kevlar® 745, 2 layers of graphite fabrics, 2 Ti alloy plates 0.063-in and 0.09-in thick, and Ultem®powder. The Ti plates were placed near the exterior of the foamed composite but on the inside of a graphite fabric. The composite was foamed at 318° C. and 3280 psi of nitrogen fluid. Two facesheets each contains 18 plies of phenolic coated K745 were molded and

TABLE 1

| Material | $t_{ig}$ (s) | $t_b$ (s) | HRR$_{peak}$ (kW/m$^2$) | $t_{peak}$ (s) | THR (MJ/m$^2$) | HRR$_{60S}$ (kW/m$^2$) | HRR$_{180S}$ (kW/m$^2$) |
|---|---|---|---|---|---|---|---|
| Black PMMA | 26 | 1154 | 715 | 880 | 727.6 | 345 | 526 |
| 0202.PB02 | 399 | 3450 | 95 | 770 | 180.3 | 7 | 33 |
| 0301.PB013 | 603 | 1574 | 29 | 1045 | 15.7 | 9 | 16 |
| 0302.LCP10 | 287 | 2052 | 84 | 305 | 78.7 | 63 | 48 |

| Material | HRR$_{300S}$ (kW/m$^2$) | HRR$_{30S, MAX}$ (kW/m$^2$) | 10-90 MLR (g/m$^2$-s) | Initial Mass (g) | Final Mass (g) | Mass Loss (g) | Mass Loss (%) |
|---|---|---|---|---|---|---|---|
| Black PMMA | 571 | | 27.8 | 307.8 | 0.2 | 307.7 | 100 |
| 0202.PB02 | 48 | 94 | 2.3 | 226.4 | 154.1 | 69.7 | 30.8 |
| 0301.PB013 | 18 | 28 | 0.9 | 198.4 | 183.1 | 11.7 | 5.9 |
| 0302.LCP10 | 46 | 76 | 1.7 | 64.7 | 33.8 | 30 | 46.4 |

| Material | EHC (MJ/kg) | SEA (m$^2$/kg) | SPR(1/s) | SR$_1$ (m$^2$/m$^2$) | SR2 (m$^2$/m$^2$) | TSR (m$^2$/m$^2$) |
|---|---|---|---|---|---|---|
| Black PMMA | 23.7 | 90 | | | | |
| 0202.PB02 | 22.9 | 189 | 0.41 | 98 | 1493 | 1591 |
| 0301.PB013 | 11.8 | 54 | 0.08 | 110 | 72 | 182 |
| 0302.LCP10 | 23.2 | 127 | 0.22 | 96 | 430 | 525 |

0202.PBO2: Kevlar ®/Xydar ® foamed composite sandwich
0301.PBO13: PBO/Xydar ® foamed composite sandwich
0302.LCP10: PBO/Xydar ® foamed composite

Example 7

Kevlar®/carbon/Ultem® foamed composites (5 layers of K745 and 2 layers of graphite fabric) prepared as described above were cut into near cubical shapes for compression testing. The density of this foamed composite is about 15.83 pcf. This product has a yield strength of about 800 psi that occurs at about 5% applied strain. After this yield point the bonded to the foamed core using EA9696 adhesive. This foamed composite sandwich weighed 10.98 psf.

Example 10

Polycarbonate powders were obtained from Global Polymers LLC (118 Huntington Ave. #806, Boston, Mass. 02116). A foamed composite was fabricated using 12 plies of Kevlar® 745, 4 plies of graphite fabric, and alternating layers of polycarbonate powder. The composite was foamed at 220° C. and 2900 psi of nitrogen. It weighed 27.7 pcf. A cross-sectional view shows that all the fabrics are parallel and pore sizes are generally less than about 200 micron meter.

There has thus been described a multi layer foamed composite armor system comprising multiple plies or layers of ballistic resistant polymeric fabrics or other materials interleaved with polymeric foam and further optionally including ceramic and/or metallic facesheets that improve the ballistic performance of the composite armor in certain applications. The foamed composites of the present invention are light in weight, highly ballistic resistant and can serve as both ballistic protection and, because of their laminated structure, structural members supporting vehicular or aircraft members. Applications of the foamed composite sandwiches fabricated in accordance with this invention also include, but are not limited to: portable armor shield for soldiers and policeman, unmanned vehicles, fighters, military helmets, body armor, combat vehicles (such as tanks armored personnel carriers and trucks), temporary military stations and housing, temporary aircraft runways, bottom panels of military helicopters, certain critical areas of surface vehicles and submarines, near engine structures for aircraft, high speed racing sport and civilian transport vehicles, temporary runways and parking lots for aircraft, floor panels and decks of ships and boats, acoustic dampening, flame-resistant firewalls for racing circuit and passenger cars, truck and train components, off-shore platform, and ballistic resistant furniture.

As the invention has been described, it will be apparent to those skilled in the art that the same may be varied in many ways without departing from the spirit and scope of the invention. Any and all such modifications are intended to be included within the scope of the appended claims.

What is claimed is:

1. A laminated composite armor comprising a plurality of alternating plies of open or closed cell engineering polymer polymeric foam having a pore size below about 0.1 inch laminated with interleaved layers of ballistic resistant fabric, sheets or plates.

2. The laminated composite armor of claim 1 wherein said open or closed cell polymeric foam comprises a polymer selected from the group consisting of polyetherimide, polycarbonate and liquid crystal polymers, said ballistic resistant ballistic fabrics, sheets or plates are selected from the group consisting of tightly woven para-aramid, ultra high molecular weight polyethylene, polybenzobisoxazole, and graphite/epoxy fabrics with an extension modulus over 10 msi, and ceramic, metallic, superalloy, intermetallic, metal matrix composite, and ceramic matrix composite sheets or plates having a hardness over 1000 kg/mm$^2$ and titanium, aluminum alloy, boron carbide and boron epoxy sheets and plates.

3. A laminated composite armor comprising a plurality of alternating plies of open or closed cell polymeric foam having a pore size below about 0.1 inch laminated with interleaved layers of ballistic resistant fabric, sheets or plates and further including reinforcing fibers or whiskers in said open or closed cell polymeric foam plies.

4. A laminated composite armor comprising a plurality of alternating plies of the same or different open or closed cell engineering polymer polymeric foam having a pore size below about 0.1 inch laminated with interleaved layers of the same or different ballistic resistant fabric, sheets or plates.

\* \* \* \* \*